March 22, 1960 E. L. SLOAN ET AL 2,929,397
MOVEMENT COMPENSATION MEANS FOR PIPING SYSTEM
Filed Dec. 31, 1956 2 Sheets-Sheet 1
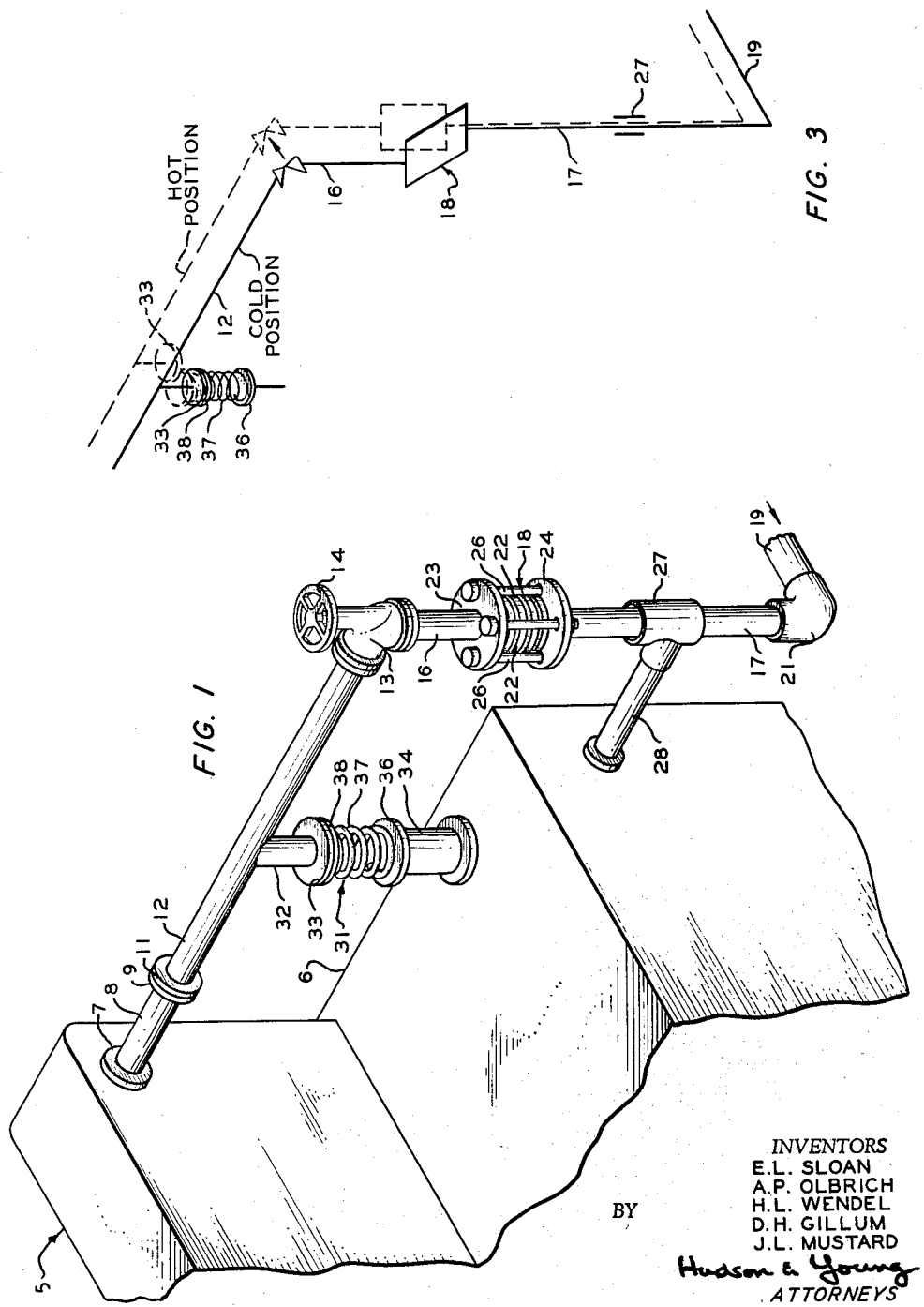
INVENTORS
E.L. SLOAN
A.P. OLBRICH
H.L. WENDEL
D.H. GILLUM
J.L. MUSTARD
BY
Hudson & Young
ATTORNEYS March 22, 1960  E. L. SLOAN ET AL  2,929,397
MOVEMENT COMPENSATION MEANS FOR PIPING SYSTEM
Filed Dec. 31, 1956  2 Sheets-Sheet 2
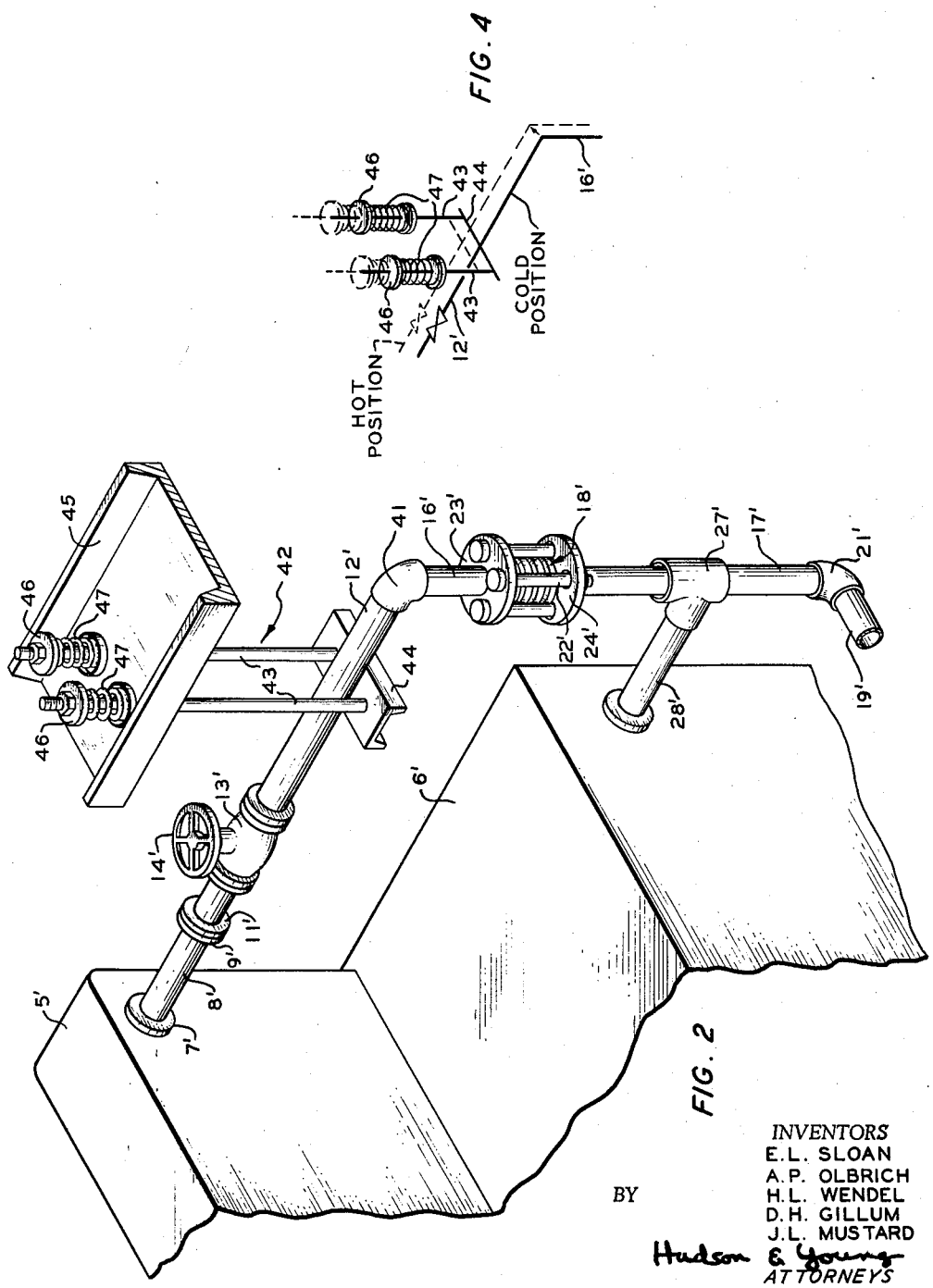
INVENTORS
E.L. SLOAN
A.P. OLBRICH
H.L. WENDEL
D.H. GILLUM
J.L. MUSTARD
BY Hudson & Young
ATTORNEYS

United States Patent Office 2,929,397
Patented Mar. 22, 1960

2,929,397

MOVEMENT COMPENSATION MEANS FOR PIPING SYSTEM

Earl L. Sloan, Bartlesville, Okla., and Alvin P. Olbrich, Jack L. Mustard, Dan H. Gillum, and Harry L. Wendel, Phillips, Tex., assignors to Phillips Petroleum Company, a corporation of Delaware Application December 31, 1956, Serial No. 631,707

8 Claims. (Cl. 137—356)

This invention relates to novel movement compensation means for piping systems. More particularly, it relates to a novel combination of means for compensating the movement of the steam supply piping system of a high speed turbine installation.

Piping systems used in extremely high and changing temperature processes are often subjected to undesirable movement caused by various operating forces, such as thrust, torsional stress, and bending. These forces can be due to temperature changes, weight and positions of pipe sections, internal pressure of fluid being conveyed by the piping system, mechanical oscillation or vibration, and the like.

Such movements, if not checked or compensated effectively, can cause misalignment of pipes with consequent leakage or other damage. This is especially true in the case of high speed steam turbine installations where even slight misalignment, for example, at the steam inlet, can disturb the sensitive alignment or balance of turbine components.

This invention is particularly applicable in combination with the steam supply piping system of a high speed steam turbine, and the following discussion will illustrate our invention as applied thereto; however, it is to be understood that our invention is not to be unduly limited thereto.

Accordingly, an object of our invention is to provide novel movement compensation means for a piping system.

Another object is to provide a balanced piping system, the temperature induced movement of which is compensated.

Another object is to provide a novel combination of movement compensating or accepting means for the steam supply piping system of a high speed steam turbine, which means will ensure the sensitive alignment or balance of the turbine components.

Further objects and advantages of our invention will become apparent to those skilled in the art from the following discussion, appended claims, and drawing in which:

Figures 1 and 2 are isometric views of piping systems illustrating two embodiments of our invention; and Figures 3 and 4 are schematic views of portions of Figures 1 and 2, respectively, showing the operations thereof.

Referring to the drawing now, and to Figure 1 in particular, wherein the piping system is in its operative or hot position, a turbine installation is shown generally designated 5 which can be mounted on a suitable base 6, such as concrete. The turbine 5 is provided with an inlet 7 which is welded or bolted to a turbine nozzle 8 which lies in a substantially horizontal plane. The turbine nozzle 8 is provided with a flange 9 which is bolted to the flange 11 of a horizontal pipe 12; a gasket or other fluid-tight means can be interposed between these flanges and the latter can be disconnected for purposes of inspection and adjustment. The other end of pipe 12 is connected by angle valve 13, having a throttle valve stem 14, to a vertical pipe section 16. Valve 13 can be provided with well known means for bleeding steam. The lower end of the pipe section 16 is interconnected with a second vertical pipe section 17 by a tied expansion joint generally designated 18. The lower end of vertical pipe section 17 is connected to a horizontal pipe 19 by L bend 21.

Tied expansion joint 18 comprises a bellows made of flexible corrugated sections 22; the opposite ends of the bellows are welded or connected by any suitable known means to pipe sections 16, 17. Suitable annular flanges 23, 24 (having diameters greater than the bellows) are welded or otherwise secured to pipe sections 16, 17, respectively, at points adjacent to the ends of the bellows. Tie rods or bolts 26 are pivotally secured at their ends to flanges 23, 24 and are positioned adjacent the sides of the bellows. The ends of tie rods 26 pass through openings in the flanges 23, 24 near the peripheries thereof and suitable adjusting nuts are threadedly connected to the protruding ends; the openings in the flanges are larger than the diameter of the rods to permit lateral movement of the flanges with respect to one another. Other means for pivotally securing the tie rods 26 can be employed.

The corrugated sections 22 are made of flexible material, such as relatively light gauge metal, e.g., copper or stainless steel, capable of withstanding operating pressure, and the tied expansion joint 18 is provided with an internal metal sleeve to prevent fluid from entering the corrugated sections.

The tie rods 26 prevent the expansion of the corrugated sections 22 along the central axis thereof but allow the pipe section 16 to move laterally with respect to pipe section 17. As such, elongation or vertical movement of either pipe section 16, 17 is translated to the other vertical pipe section, the entire vertical piping acting as a unit.

Movement of pipe 17 is limited to only vertical movement by the provision of guide 27, which can be a short section of T pipe having an inside diameter larger than the outside diameter of pipe section 17, which T pipe encircles the latter and allows it to slidably move therein. Guide 27 can be anchored to base 6 by a horizontal pipe 28.

Pipe 12, which can move vertically as well as laterally, is supported by a slidable spring support member, generally designated 31, which comprises an upper vertical pipe section 32, the upper end of which is cut or otherwise adapted to provide a saddle for pipe 12, and the lower end of which is welded or otherwise secured to a circular plate 33. The other end of the support 31 comprises a pipe 34 which is anchored to base 6; the upper end of pipe 34 is provided with an adjustable plate 36 which supports an adjustable compression spring 37 surmounted by plate 38 secured thereto. The weight of the entire piping system (pipes 12, 16, 17, 19) is supported by support member 31. Vertical movement of pipe 12 is translated to spring 37 and lateral movement of pipe 12 to the same by a sliding engagement between plates 33, 38.

The following is a discussion of the operation of the piping system illustrated in Figure 1, reference also being made to the schematic view of Figure 3 which will visually aid an understanding of the operation.

The piping system is initially installed as shown by the solid lines of Figure 3. The tied expansion joint 18 is initially in a cocked or tilted position, that is, the vertical pipe sections 16, 17 are not initially installed in vertical alignment but rather are displaced as shown with the top of the tied expansion joint moved to the left with respect to the bottom thereof. With valve 13 closed, or bleeding off steam, the temperature change in pipe sections 16, 17 causes them to move vertically downward as a unit, directed by guide 27, the tied expansion joint 18 remaining in its cocked or displaced position; the horizontal pipe 19 will, of course, move vertically downward also. Upward vertical movement of these pipe sections at this time will be negligible due to the weight of the piping system being supported by spring support 31. Figure 3 does not serve to indicate this movement as only the initial in-operative or cold position and the final operative or hot position are shown.

When the throttle valve 13 is opened, allowing fluid, such as super-heated steam, to enter the turbine 5, via pipe 12 and anchored nozzle 8, various undesirable forces would act upon the connection between flanges 9, 11 but for the movement compensation means of our invention. Such forces would be exerted during temeprature changes in the piping system, especially when opening or closing throttle valve 13.

The temperature change in pipe 12 and nozzle 8, especially the change within the turbine installation itself, causes the first two to move from a cold position to a hot position—which relative positions are shown in Figure 3. That is, the expansion of the turbine installation causes the nozzle 8 to slightly move laterally outward and vertically upward, the combination of these movements being a vector (as shown) of the two. The pipe 12 moves correspondingly with nozzle 8, plate 33 sliding on plate 34 and spring 37 expanding. After spring 37 expands, plate 36 can be adjusted. At the same time, pipe section 16 and tied expansion joint 18 move laterally to the right and vertically upward, the latter means occupying an uncocked or upright position. Pipe section 17 and pipe 19 accordingly only move vertically upward. These movements may be exceedingly small, e.g., 1/16 inch; however, in view of the fact that the highly sensitive turbine may be rotating at high speeds, e.g., 8400–9000 r.p.m., severe damage to the turbine, such as misalignment, and/or inefficiency, will occur if these movements are not compensated according to our invention. Moreover, leakage in the piping system, particularly between the flanges 9, 11, may also occur if these movements are not compensated.

Reference will now be made to Figure 2, wherein a further embodiment of our invention is illustrated and wherein primed reference characters are used to designate like elements corresponding to Figure 1. The throttle valve 14' is positioned intermediate the ends of pipe 12', one end of the latter being connected to vertical pipe section 16' by L bend 41. In place of the spring support member 31 of Figure 1, an adjustable spring pipe hanger generally designated 42 is employed. The latter comprises a pair of depending rods 43 which are positioned on either side of pipe 12' and carry a plate 44 upon which pipe 12' is slidably supported. The rods 43 are themselves carried by a suitable beam 45, such as an I beam as shown, the rods passing upwardly through suitable openings, which may be larger than the diameters of the rods. The upper ends of the rods 43 can be provided with adjusting nuts. Suitable adjusting plates 46 are threadedly secured to the upper ends of rods 43 and adjustable compression springs 47 are interposed between the bottom faces of the plate 46 and the upper surface of the beam. The lower ends of the springs 47 can be placed or retained in suitable cups secured to the beam 45.

The operations of the piping system of Figure 2 is as follows, reference also being made to Figure 4. The piping system of this embodiment is initially installed in the same manner as that of Figure 1, i.e., the tied expansion joint 18' is initially cocked, and the operation of the elements are the same except for that of the hanger 42. With steam present in pipes 19', 17', 16' and the portion of pipe 12' upstream from valve 13', that is, with valve 13' in its closed position, tied expansion joint 18' will move from its cocked or displaced position toward its normal upright position; this movement will be substantially completed, depending upon the amount of growth in pipe 12'. Pipe sections 16', 17' will only move vertically downward at this time.

Upon the introduction of steam into the turbine 5', nozzle 8' will move in the same manner as that in Figure 1, and the entire pipe 12' will move correspondingly, including some upward vertical movement which will decrease the force exerted on springs 47 allowing the plate 44 to vertically rise with pipe 12'. At this time, plates 46 can be adjusted with the piping system in its operative position. With the further expansion and movement of pipe 12', pipe sections 16', 17' will vertically move upward and pipe 12' will slide a further distance on plate 44. Tied expansion joint 18' will complete its lateral movement to its upright position.

In both of the embodiments of our invention, when the throttle valves are closed, the piping systems will return, after a period of time, to their initial or cold positions, the tied expansion joint returning to its displaced position.

Various modifications and alterations of our invention will become apparent, to those skilled in the art, without departing from the spirit and scope of our invention, and it is to be understood that the foregoing description and drawing are merely preferred embodiments which do not unduly limit our invention.

We claim:

1. A steam supply pipe system comprising, in combination, a first pipe disposed in a substantially horizontal plane and adapted to be connected at one end to the steam inlet of a turbine, a second pipe disposed in a substantially vertical plane, said second pipe comprising upper and lower pipe sections interconnected at adjacent ends by a tied expansion joint mounted to permit the lateral displacing movement of said upper pipe section with respect to said lower pipe section, the upper end of said upper pipe section being connected to the other end of said first pipe by a joint structure, a guide member slidably connected at one end to said lower pipe section and anchored at the other end, said guide member mounted to limit the movement of said lower pipe section to a longitudinal direction, and spring supporting means mounted to support said first pipe and provide for a lateral and longitudinal movement thereof, said movements being responsive to temperature changes.

2. The combination according to claim 1 wherein said spring supporting means comprises a first lateral member movably secured at one end to said first pipe and having a first slide member secured at the other end, a second lateral member anchored at one end, and a compression spring secured at one end to the other end of said second lateral member and having a second slide member secured at its other end, said first slide member mounted to slide over said second slide member with the longitudinal movement of said first pipe, said spring being responsive to the lateral movement of said first pipe.

3. The combination according to claim 1 wherein said spring supporting means comprises rod means suspended from a support, said rod means carrying a support member mounted to slidably carry in a longitudinal direction said first pipe, compression spring means interposed between said support and adjustable plate means carried by the upper end of said rod means, said spring means being responsive to the lateral movement of said first pipe.

4. The combination according to claim 1 wherein said joint structure is an angle throttle valve.

5. The combination according to claim 1 wherein a throttle valve is interposed in said first pipe.

6. The combination according to claim 1 wherein a third pipe disposed in a substantially horizontal plane is connected to the lower end of said lower pipe section by a joint structure, whereby lateral movement of said third pipe is translated into vertical movement by said lower pipe section, said second pipe adapted to move vertically as a unit.

7. The combination according to claim 1 wherein said tied expansion joint is mounted to move from a tilted position to an upright position in response to temperature change, said upper and lower pipe sections disposed in out-of-line relation when said tied expansion joint is in said tilted position and disposed in axial alignment when said tied expansion joint is in said upright positon.

8. Fluid conducting means comprising, in combination, first fluid confining means having one end anchored, spring supporting means mounted to support said first means and provide for a lateral and longitudinal movement thereof, second fluid confining means disposed in a plane substantially perpendicular to said first means, said second means comprising third and fourth fluid confining means interconnected at adjacent ends by fifth means to provide for a lateral displacing movement of said third means with respect to said fourth means, the other end of said first means being rigidly connected to the other end of said third means, and a guide member slidably connected at one end to said fourth means and anchored at the other end, whereby the movement of said fourth member is limited to only a longitudinal direction, said movements being responsive to temperature changes.

References Cited in the file of this patent
UNITED STATES PATENTS

| | | |
|---|---|---|
| 1,240,521 | Wendland | Sept. 18, 1917 |
| 1,677,740 | Weathehead | July 17, 1928 |
| 2,335,478 | Bergman | Nov. 30, 1943 |
| 2,396,086 | Conaway | Mar. 5, 1946 |
| 2,397,094 | Donkersley | Mar. 26, 1946 |
| 2,404,447 | Marancik et al. | July 23, 1946 |
| 2,451,252 | Stoeckly | Oct. 12, 1948 |
| 2,592,372 | Altorfer | Apr. 8, 1952 |
| 2,745,422 | Wilson | May 15, 1956 |

FOREIGN PATENTS

| | | |
|---|---|---|
| 705,870 | Great Britain | Mar. 17, 1954 |